US009426034B2

(12) United States Patent
Burton et al.

(10) Patent No.: US 9,426,034 B2
(45) Date of Patent: Aug. 23, 2016

(54) USAGE POLICY FOR RESOURCE MANAGEMENT

(71) Applicant: International Business Machines Corporation, Armonk, NY (US)

(72) Inventors: Peter H. Burton, Vancouver (CA); Manvendra Gupta, Brampton (CA); Helena Litani, Vaughan (CA)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 14/305,133

(22) Filed: Jun. 16, 2014

(65) Prior Publication Data

US 2015/0365291 A1 Dec. 17, 2015

(51) Int. Cl.
*H04L 12/24* (2006.01)
*H04L 29/08* (2006.01)
*H04L 12/911* (2013.01)

(52) U.S. Cl.
CPC ............ *H04L 41/0893* (2013.01); *H04L 47/70* (2013.01); *H04L 67/306* (2013.01)

(58) Field of Classification Search
CPC ..... H04L 67/10; H04L 47/70; H04L 67/2833; H04L 41/5032; H04L 63/102; H04L 41/5054
USPC ................. 709/226, 224, 225, 229
See application file for complete search history.

(56) References Cited

U.S. PATENT DOCUMENTS

| 8,341,441 | B2 * | 12/2012 | Fletcher ............... G06F 1/3203 713/300 |
| 8,612,599 | B2 | 12/2013 | Tung et al. |
| 2006/0029097 | A1 * | 2/2006 | McGee ................. H04L 47/10 370/468 |
| 2010/0319004 | A1 | 12/2010 | Hudson et al. |

(Continued)

FOREIGN PATENT DOCUMENTS

| WO | 02065286 A2 | 8/2002 |
| WO | 2010035281 A4 | 5/2010 |
| WO | 2012024955 A1 | 3/2012 |

OTHER PUBLICATIONS

Banu, et al., "Optimizing the Cost of Resource Subscription Policy in IaaS Cloud", International Journal of Engineering Trends and Technology (IJETT), vol. 6, No. 5, ISSN 2231-5381, Dec. 2013, pp. 296-301

(Continued)

*Primary Examiner* — Ruolei Zong
(74) *Attorney, Agent, or Firm* — Maeve Carpenter

(57) ABSTRACT

A tool for a computing service using a computing usage policy. The tool receives by one or more computer processors, a configured usage policy. The tool validates, by one or more computer processors, the configured usage policy. The tool determines, by one or more computer processors, one or more rules governing the configured usage policy. The tool executes, by one or more computer processors, the one or more rules governing the configured usage policy. The tool manages, by one or more computer processors, one or more cloud service resources according to the configured usage policy.

18 Claims, 3 Drawing Sheets

(56) References Cited

U.S. PATENT DOCUMENTS

| | | |
|---|---|---|
| 2011/0131309 A1 | 6/2011 | Akiyama et al. |
| 2011/0145094 A1 | 6/2011 | Dawson et al. |
| 2011/0265147 A1 | 10/2011 | Liu |
| 2012/0117478 A1* | 5/2012 | Vadde .............. G06F 9/54 715/736 |
| 2012/0226808 A1* | 9/2012 | Morgan ............ G06F 9/5072 709/226 |
| 2013/0019015 A1 | 1/2013 | Devarakonda et al. |
| 2013/0041852 A1* | 2/2013 | Ellis ................. G06Q 50/06 705/412 |
| 2013/0060933 A1* | 3/2013 | Tung ............... G06F 11/3495 709/224 |
| 2013/0132561 A1 | 5/2013 | Pasala et al. |
| 2013/0185413 A1 | 7/2013 | Beaty et al. |
| 2014/0280978 A1* | 9/2014 | Martinez ........... H04L 41/5032 709/226 |

OTHER PUBLICATIONS

Jamkhedkar, et al., "Usage Management in Cloud Computing", 2011 IEEE 4th International Conference on Cloud Computing, Copyright 2011, pp. 525-532.

Sakr, et al., "SLA-Based and Consumer-Centric Dynamic Provisioning for Cloud Databases", 2012 IEEE Fifth International Conference on Cloud Computing. Copyright 2012. pp. 360-367.

"SOCCI Framework Technical Standard: Viewpoints", The Open Group, Copyright 1995-2013 (downloaded Apr. 7, 2014), <http://www.opengroup.org/soa/source-book/socci/viewpoints.htm>.

Wehle. "Cloud Billing Service". IBM, Feb. 9, 2011, <http://www.ibm.com/developerworks/cloud/library/cl-devcloudmodule/>.

* cited by examiner

USAGE POLICY FOR RESOURCE MANAGEMENT

BACKGROUND OF THE INVENTION

The present invention relates generally to cloud computing, and more particularly to policy-based cloud resource management.

Cloud computing defines an approach to providing scalable and distributed information technology (IT) services to a variety of users, each having a different user role. A cloud service provider owns, manages, and operates live cloud computing systems to deliver services to consumers, including third parties and end users. A cloud service consumer uses or subscribes to cloud services. A cloud service developer develops technical and business aspects associated with cloud services. Cloud service integrators provide composite cloud services to cloud service consumers by integrating and aggregating services offered by cloud service providers.

The relationships between the various cloud user roles take on a variety of forms. When a cloud service consumer enters an agreement with a cloud service provider, they are often billed for all cloud services they have requested, regardless of whether they are always being utilized. The cloud service consumer is simply billed for cloud services used until they expire or they are ceased, and as such, cloud service consumers are often billed for their consumption when they are not consuming the cloud service. Some cloud service providers offer subscription-based software as a service (SaaS) on a pay-as-you-go, metered basis, however, cloud service consumers are still charged for cloud services even when they are not being consumed. Take for example a cloud service consumer who is consuming a cloud service to enable them to design and build a software application. The development environment being used is the cloud service, and it has been established, maintained, and provided by a cloud service provider. At some point in time, the cloud service consumer wishes to promote their application through different environments from development, for instance into test, pre-production, and production. As the application moves through each phase of the cloud service, some aspects of the cloud service may no longer be in use (i.e., when the application moves to pre-production, development may no longer be in use). However, it is commonplace for the cloud service consumer to be charged for all phases of the cloud service unless the cloud service consumer explicitly ceases the cloud service.

SUMMARY

Aspects of an embodiment of the present invention disclose a method, system, and a computer program product for managing a computing service using a computing usage policy. The method includes receiving, by one or more computer processors, a configured usage policy. The method includes validating, by one or more computer processors, the configured usage policy. The method includes determining, by one or more computer processors, one or more rules governing the configured usage policy. The method includes executing, by one or more computer processors, the one or more rules governing the configured usage policy. The method includes managing, by one or more computer processors, one or more cloud service resources according to the configured usage policy.

DETAILED DESCRIPTION

Figure 1:
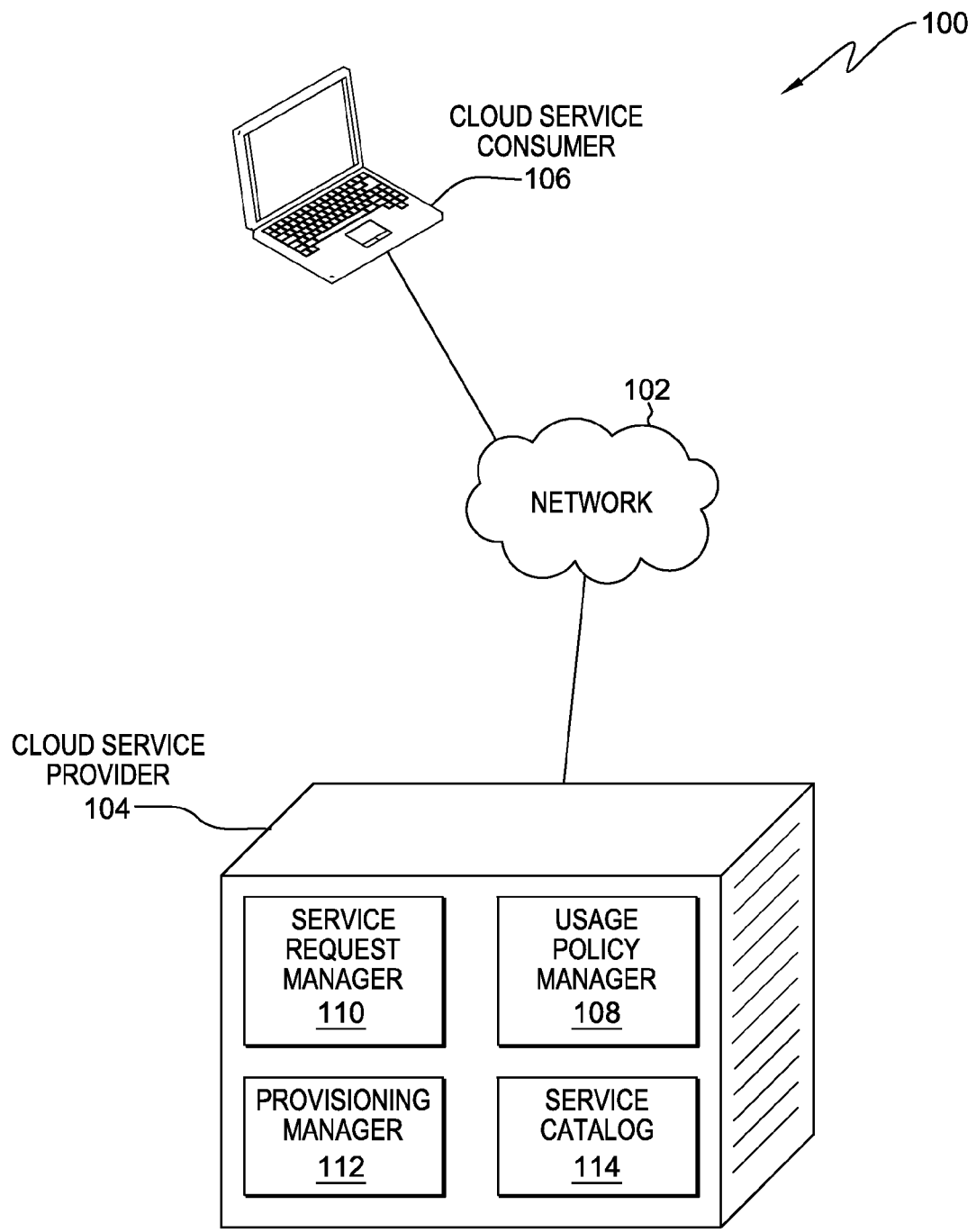
FIG. 1 is a functional block diagram illustrating a data processing environment, generally designated 100, in accordance with an embodiment of the present invention.

Embodiments of the present invention recognize that spiraling usage costs are often incurred by a cloud service consumer because there is no effective way for the cloud service consumer to define a usage policy, and have a cloud service provider apply and manage the usage policy.

Embodiments of the present invention provide the capability for a cloud service consumer to define a cloud service usage policy with a cloud service provider to optimize allocation of cloud resources to reduce the costs incurred by the cloud service consumer utilizing the cloud services.

Implementation of such embodiments may take a variety of forms, and exemplary implementation details are discussed subsequently with reference to the Figures.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or an external storage device via a network, for example, the Internet, a local area network, a wide area network and/or a wireless network. The network may comprise of copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processors, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The present invention will now be described in detail with reference to Figures. FIG. 1 illustrates a data processing environment, generally designated 100, including a network 102, a cloud service provider 104, and a cloud service consumer 106, in accordance with an embodiment of the present invention.

In the exemplary embodiment, network 102 is the Internet representing a worldwide collection of networks and gateways that use TCP/IP protocols to communicate with one another. Network 102 may include wire cables, wireless communication links, fiber optic cables, routers, switches and/or firewalls. Cloud service provider 104 and cloud service consumer 106 are interconnected by network 102. Network 102 can be any combination of connections and protocols capable of supporting communications between cloud service provider 104 and cloud service consumer 106. Network 102 may also be implemented as a number of different types of networks, such as an intranet, a local area network (LAN), a virtual local area network (VLAN), or a wide area network (WAN). FIG. 1 is intended as an example, and not as an architectural limitation for the different embodiments.

In the exemplary embodiment, cloud service provider 104 may be, for example, a server computer system such as a management server, web server, or any other electronic device or computing system capable of sending and receiving data. In another embodiment, cloud service provider 104 may be a data center, consisting of a collection of networks and servers providing an IT service, such as virtual servers and applications deployed on virtual servers, to an external party. In another embodiment, cloud service provider 104 represents a "cloud" of computers interconnected by one or more networks, where cloud service provider 104 is a computing system utilizing clustered computers and components to act as a single pool of seamless resources when accessed through network 102. This is a common implementation for data centers in addition to cloud computing applications.

In the exemplary embodiment, cloud service provider 104 includes a usage policy manager 108, a service request manager 110, a provisioning manager 112, and a service catalog 114. In the exemplary embodiment, usage policy manager 108 is a software-based service program, visualized through a web page accessed through a browser, for defining a cloud service usage policy to optimize allocation of one or more cloud service resources provided by a cloud service provider, such as cloud service provider 104, to reduce costs incurred by a cloud service consumer, such as cloud service consumer 106. In the exemplary embodiment, usage policy manager 108 is implemented as a software-based service program within cloud service provider 104. Usage policy manager 108 is deployed as a cloud service provisioned by a cloud service provider, such as cloud service provider 104. For example, usage policy manager 108 may function as a cloud service requested by a cloud service consumer, such as cloud service consumer 106, to manage how the cloud service consumer utilizes one or more cloud services provisioned by one or more other cloud service providers (not shown). In another embodiment, usage policy manger 108 may be a software-based service program provided as a cloud service through a third party cloud service provider (not shown). In yet another embodiment, usage policy manager 108 may include a plurality of usage policy managers capable of communicating with one another to optimize allocation of one or more cloud service resources provided by a plurality of cloud service providers. A plurality of usage policy managers may be interconnected, forming different layers of usage policy managers. For example, a cloud service consumer may request a cloud service from both Amazon® and Google®. The cloud service consumer may link two usage policy managers together to ensure that aspects of the Amazon® cloud service are not better served by the Google® cloud service, and vise versa.

In the exemplary embodiment, service request manager 110 is a software-based program responsible for processing cloud service requests from a cloud service consumer, such as cloud service consumer 106. Service request manager 110 receives a cloud service request from a cloud service consumer, such as cloud service consumer 106, containing information relating to the type of cloud service requested. In the exemplary embodiment, the cloud service request contains a selection of services, and information related to the selection of services, including, but not limited to, a type of service, one or more components of the service, duration of the service, etc. For example, service request manager 110 may receive a cloud service request for a virtual server, configured to operate on Linux®, and including one or more components, such as a database, an application server, and a development tool, for a time period of six months. In the exemplary embodiment, service request manager 110 is responsible for decomposing the cloud service request, wherein decomposing the cloud service request includes identifying the selection of services and information related to the selection of services and defining the selection of services as a metadata model, represented as XML data, for processing by a provisioning manager, such as provisioning manager 112. In the exemplary embodiment, service request manager 110 sends the selection of services and information related to the selection of services to provisioning manager 112 as instructions for providing applications, platforms, and infrastructure to fulfill the cloud service request.

In the exemplary embodiment, provisioning manager 112 is a software-based program responsible for provisioning applications, platforms, and infrastructure to fulfill a cloud service request. For example, provisioning manager 112 may provision a virtual network, a storage device, a platform, an operating system, an application, and a web server into a managed cloud program (not shown) within cloud service provider 104 to establish a cloud service that fulfills a cloud service request.

In the exemplary embodiment, service catalog 114 is a catalog including a plurality of options, services, provisions, and infrastructure offered by a cloud service provider, such as cloud service provider 104. A cloud service consumer, such as cloud service consumer 106, can make selections from service catalog 114 when subscribing to a cloud service.

In the exemplary embodiment, cloud service consumer 106 is a client to cloud service provider 104, and may be, for example, a desktop computer, a laptop computer, a tablet computer, a personal digital assistant (PDA), a smart phone, a thin client, or any other electronic device or computing system capable of communicating with cloud service provider 104 through network 102. Cloud service consumer 106 includes a processor (not shown) and one or more data storage devices (not shown). The processor can be any custom made or commercially available processor, a central processing unit (CPU), an auxiliary processor among several processors associated with the computer, a semiconductor based microprocessor, a macro processor, or generally any device capable of executing instructions. The one or more data storage devices can be at least one of the random access memory (RAM), read only memory (ROM), a cache, a stack, or the like that can temporarily or permanently store electronic data. In the exemplary embodiment, cloud service consumer 106 includes an internet browsing program (not shown) for communicating securely with cloud service provider 104, and provides respective user interfaces for viewing and communicating with the cloud service provider via a web page, a web portal, etc.

Data processing environment 100 may include additional cloud service providers, third party cloud service providers, cloud service consumers, displays, and other devices not shown.

Cloud service provider 104 and cloud service consumer 106 each maintain respective internal components, and respective external components. In general, cloud service provider 104 and cloud service consumer 106 can be any programmable electronic device as described in further detail with respect to FIG. 3.

Figure 2:
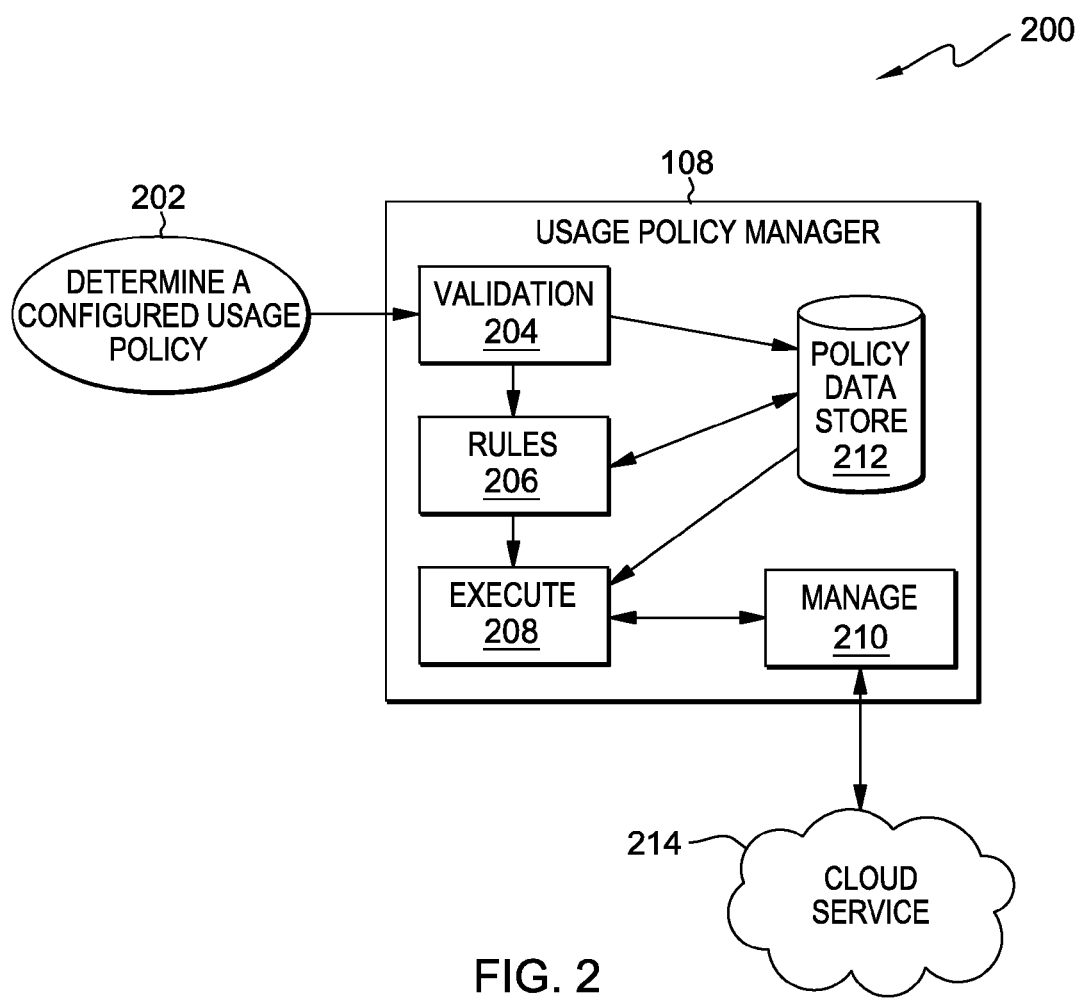
FIG. 2 is a functional block diagram, generally designated 200, depicting the steps of a usage policy manager for defining a cloud service usage policy, in accordance with an embodiment of the present invention.

FIG. 2 is functional block diagram depicting the steps of usage policy manager 108 for defining a cloud service usage policy, in accordance with an embodiment of the present invention.

Usage policy manager 108 determines a configured usage policy (202). In the exemplary embodiment, usage policy manager 108 determines a configured usage policy from a cloud service consumer, wherein the configured usage policy can be used to create a new usage policy. The configured usage policy includes a set of parameters and one or more parameter values. For example, the configured usage policy may include, without limitation, information on one or more associated physical resources of a cloud service, a timeframe or duration when the cloud service will be consumed, one or more policy driven rules for governing usage of the cloud service, a usage pattern, a number of users, and a number of machines. In another embodiment, usage policy manager 108 may update an existing configured usage policy. For example, usage policy manager 108, in response to a request to update an existing configured usage policy from a cloud service consumer, such as cloud service consumer 106, may retrieve the existing configured usage policy from policy data store 212, and update the existing configured usage policy according to updated parameters provided by the cloud service consumer, or by environmental factors, such as an actual usage pattern. In yet another embodiment, usage policy manager 108 may delete an existing configured usage policy. For example, usage policy manager 108, in response to a request to delete an existing configured usage policy from a cloud service consumer, such as cloud service consumer 106, may retrieve the existing configured usage policy from policy data store 212, and delete the existing configured usage policy.

In the exemplary embodiment, a cloud service consumer communicates the configured usage policy directly to usage policy manager 108. For example, when a cloud service consumer, such as cloud service consumer 106, subscribes to a selection of services offered in a service catalog of a cloud service provider, such as service catalog 114 of cloud service provider 104, the cloud service consumer may configure a usage policy for the cloud service by providing responses to a set of configuration prompts from a usage policy manager 108 using a web browser to access the usage policy manager directly via a web page. For example, a cloud service consumer may select one or more options, such as Monday-Friday usage, between the hours of 8 AM to 5 PM in a specific time zone, and decommission cloud service if inactive for 30 days. In another embodiment, a usage policy may be configured by a service request manager of a cloud service provider based, at least in part on, inputs received from a cloud service consumer when subscribing to a selection of services offered in a service catalog of the cloud service provider. For example, when a cloud service consumer, such as cloud service consumer 106, subscribes to a selection of services by communicating directly with a cloud service manager, such as service request manager 110, cloud service consumer 106 may provide selections of services including, without limitation, a platform, an operating system, a server, a data usage, a duration of service, and a number of users, etc., to usage policy manager 108.

Usage policy manager 108 validates the configured usage policy (204). In the exemplary embodiment, usage policy manager 108 validates the configured usage policy by rendering the configured usage policy as a metadata model, describing the configured usage policy syntax and semantics. Usage policy manager 108 determines whether the configured usage policy is understandable semantically, i.e., that the configured usage policy is executable by a cloud service provider. For example, where a cloud service consumer selects a timeframe for usage during a date in time that has already past, for instance May 8, 2013, and the cloud service consumer has selected to utilize 6 servers, when only 4 are available, usage policy manager 108 may determine that the configured usage policy is not executable, and therefore invalid, as configured.

In the exemplary embodiment, usage policy manager 108 stores a valid configured usage policy in policy data store 212 as XML data. A configured usage policy in policy data store 212 can be accessed by usage policy manager 108 at any time to update the configured usage policy, re-apply the configured usage policy within an additional cloud service, or delete the configured usage policy, thereby returning the cloud service provider to a default mode of operation with respect to billing and usage of a provided cloud service.

Usage policy manager 108 determines rules for governing the configured usage policy (206). In the exemplary embodiment, usage policy manager 108 determines one or more rules for governing the configured usage policy that reflect the parameters and parameter values selected by a cloud service consumer when configuring the usage policy. Usage policy manager 108 can determine the one or more rules based on one or more factors, including, without limitation, a cost billed to a cloud service consumer for using a cloud service, a projected usage pattern with respect a cloud service, an actual usage pattern with respect a cloud service, and a complexity of a cloud service, etc. For example, usage policy manager 108 may determine a rule that turns off a server provisioned for a cloud service if the server is inactive for more than 30 days. In yet another example, usage policy manager 108 may determine a rule that aims to consolidate workload, for instance, where a cloud service consumer subscribed to a cloud service provisioning four servers, yet the total workload within the cloud service can be handled on two servers, without a significant reduction in performance. In yet another example, usage policy manager 108 may determine a rule that cancels a first cloud service and replaces it with a comparable second cloud service if the cost associated with the first cloud service exceeds a certain dollar amount.

In the exemplary embodiment, usage policy manager 108 stores the one or more rules for a configured usage policy in policy data store 212. Usage policy manager 108 can access the one or more rules associated with a configured usage policy in policy data store 212 at any time to update the one or more rules, re-apply the one or more rules to an additional configured usage policy for an additional cloud service, or delete the one or more rules, thereby returning the cloud service provider to a default mode of operation with respect to billing and usage of a provided cloud service.

In another embodiment, usage policy manager 108 may determine default rules to govern the configured usage policy. For example, where a cloud service consumer did not provide sufficient information for a configured usage policy to determine a rule, usage policy manager 108 may determine a default rule, such as bill per unit, bill per period of time, or bill per number of users. In yet another example, usage policy manager 108 may determine a rule to optimize cost to a cloud service consumer based on actual usage of a cloud service, and updating the configured usage policy once sufficient information is determined.

Usage policy manager 108 executes the configured usage policy (208). In the exemplary embodiment, usage policy manager 108 executes the configured usage policy at runtime. Usage policy manager 108 reads the configured usage policy from policy data store 212, instantiates the configured usage policy into memory, and processes it according to one or more usage policy rules of rules 206, previously established for the configured usage policy. Usage policy manager 108 controls the allocation of IT resources to a particular task during execution. For example, usage policy manager 108 may control the allocation of CPU and memory to a virtual machine, as well as the allocation of the virtual machine to a cluster of virtual machines. In the exemplary embodiment, usage policy manager 108 controls the de-allocation of IT resources during execution, according to the configured usage policy and associated rules, as it relates to controlling costs incurred by a cloud service consumer utilizing a cloud service. For example, usage policy manager 108 may de-allocate CPU and memory from a virtual machine, as well as de-allocate the virtual machine from a cluster of virtual machines to scale back a cloud service to align costs for actual usage according to the configured usage policy. In another embodiment, usage policy manager 108 may suspend (i.e., shut down) a cloud service based on a historical usage pattern associated with a cloud service consumer. For example, where a cloud service consumer typically uses a cloud service between the hours of 9 AM and 5 PM, usage policy manager 108 may shut down a cloud service after 5:30 PM, after confirming that the cloud service consumer stopped using the cloud service (i.e., allowing a grace period after 5 PM to expire indicates the cloud service consumer became inactive, and ceased using the cloud service).

Usage policy manager 108 manages the cloud resources (210). In the exemplary embodiment, usage policy manager 108 manages the cloud resources during runtime according to the configured usage policy and associated rules being executed. Usage policy manager 108 monitors the cloud service resources of a cloud service, such as cloud service 212, to manage the allocation of those resources in accordance with the configured usage policy and the one or more rules associated with the configured usage policy. In the exemplary embodiment, usage policy manager 108, utilizing management logic, performs an ongoing task of allocation and de-allocation of cloud service resources to ensure the cloud service, operates within the parameters defined by the configured usage policy and the associated rules for execution. In the exemplary embodiment, usage policy manager monitors the deployment and usage of cloud service resources that have been provisioned to fulfill the cloud service, and continuously rebalances those resources in real time to conform to the configured usage policy. For example, usage policy manager 108 may reduce memory, reduce CPU, and reduce the number of virtual machines provisioned by cloud service 214 by suspending or de-allocating one or more virtual machines from a cluster of virtual machines for a period of time. In another embodiment, usage policy manager 108 may provide data that can be used to renegotiate a cost associated with a cloud service. For example, a cloud service provider, such as cloud service provider 104, provides a cloud service to a cloud service consumer, such as cloud service consumer 106, at a certain cost for a month, such as $100 USD per month, however, the cloud service consumer only uses the cloud service four days per month. In this case, usage policy manager 108 may negotiate with cloud service provider 104, on behalf of cloud service consumer 106, for a new rate commensurate to actual usage of the cloud service, rather than a flat rate for the full month.

Figure 3:
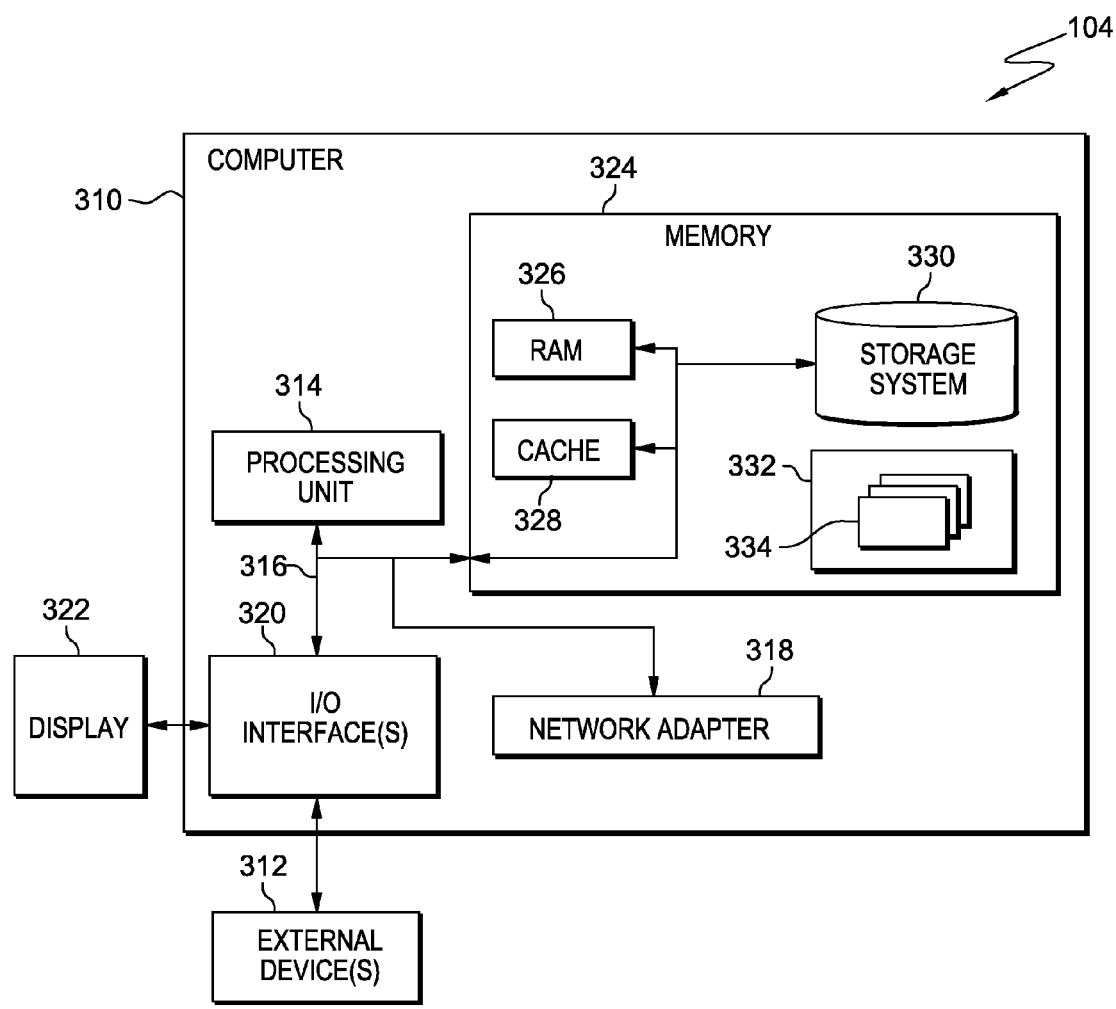
FIG. 3 is a block diagram depicting components of a data processing system (such as cloud service provider 104 of FIG. 1), in accordance with an embodiment of the present invention.

FIG. 3 depicts a block diagram of components of data processing environment 100, such as cloud service provider 104, in accordance with an illustrative embodiment of the present invention. It should be appreciated that FIG. 3 provides only an illustration of one implementation and does not imply any limitations with regard to the environments in that different embodiments may be implemented. Many modifications to the depicted environment may be made.

In the illustrative embodiment, cloud service provider 104 in data processing environment 100 is shown in the form of a general-purpose computing device. The components of computer system 310 may include, but are not limited to, one or more processors or processing units 314, a system memory 324, and a bus 316 that couples various system components including system memory 324 to processor 314.

Bus 316 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 310 typically includes a variety of computer system readable media. Such media may be any available media that is accessible by computer system 310, and it includes both volatile and non-volatile media, removable and non-removable media.

System memory 324 can include computer system readable media in the form of volatile memory, such as random access memory (RAM) 326 and/or cache memory 328. Computer system 310 may further include other removable/non-removable, volatile/non-volatile computer system storage media. By way of example only, storage system 330 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 316 by one or more data media interfaces. As will be further depicted and described below, system memory 324 may include at least one computer program product having a set (e.g., at least one) of program modules that are configured to carry out the functions of embodiments of the invention.

Program/utility 332, having one or more sets of program modules 334, may be stored in memory 324 by way of example, and not limitation, as well as an operating system, one or more application programs, other program modules, and program data. Each of the operating systems, one or more application programs, other program modules, and program data, or some combination thereof, may include an implementation of a networking environment. Program modules 334 generally carry out the functions and/or methodologies of embodiments of the invention as described herein. Computer system 310 may also communicate with one or more external devices 312 such as a keyboard, a pointing device, a display 322, etc., or one or more devices that enable a user to interact with computer system 310 and any devices (e.g., network card, modem, etc.) that enable computer system 310 to communicate with one or more other computing devices. Such communication can occur via Input/Output (I/O) interfaces 320. Still yet, computer system 310 can communicate with one or more networks such as a local area network (LAN), a general wide area network (WAN), and/or a public network (e.g., the Internet) via network adapter 318. As depicted, network adapter 318 communicates with the other components of computer system 310 via bus 316. It should be understood that although not shown, other hardware and software components, such as microcode, device drivers, redundant processing units, external disk drive arrays, RAID systems, tape drives, and data archival storage systems may be used in conjunction with computer system 310.

The flowcharts and block diagrams in the Figures illustrate the architecture, functionality, and operation of possible implementations of methods and systems according to various embodiments of the present invention. In this regard, each block in the flowcharts or block diagrams may represent a module, a segment, or a portion of code, which comprises one or more executable instructions for implementing the specified logical functions. It should be noted that, in some alternative implementations, the functions noted in the blocks may occur out of the order noted in the Figures. For example, two blocks shown in succession may, in fact, be executed substantially concurrently, or the blocks may sometimes be executed in the reverse order, or the blocks may sometimes be executed any number of steps prior to, or subsequent to, their current place in the order, depending on the functionality involved.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a," "an," and "the" are intended to include the plural forms as well, unless the context clearly indicates otherwise.

The description of the present invention has been presented for purposes of illustration and description, but is not intended to be exhaustive or limited to the invention in the form disclosed. Many modifications and variations will be apparent to persons of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for reducing usage costs incurred by a cloud service consumer through improved allocation and management of cloud service resources, the method comprising the steps of:

determining, by one or more computer processors, a configured usage policy, wherein determining the configured usage policy includes receiving one or more responses to a set of configuration prompts, wherein the one or more responses include one or more usage parameters;

validating, by one or more computer processors, the configured usage policy;

determining, by one or more computer processors, one or more rules governing the configured usage policy, wherein the one or more rules governing the configured usage policy include at least a rule to optimize usage costs to the cloud service consumer based on an actual usage of one or more cloud service resources;

executing, by one or more computer processors, the one or more rules governing the configured usage policy, wherein executing the one or more rules includes de-allocating the one or more cloud service resources to align usage costs with the actual usage of the one or more cloud service resources; and managing, by one or more computer processors, the one or more cloud service resources according to the configured usage policy, wherein managing includes negotiating with a cloud service provider for a new rate commensurate to the actual usage of the one or more cloud service resources.

2. The method of claim 1, wherein the one or more usage parameters include:
one or more associated resources of one or more cloud services;
a duration for consuming the one or more cloud services;
one or more policy driven rules governing usage of the one or more cloud services;
a usage pattern;
a number of users; and
a number of virtual machines.

3. The method of claim 1, wherein validating the configured usage policy, further comprises rendering the configured usage policy as a metadata model, wherein the metadata model describes the configured usage policy syntax and semantics.

4. The method of claim 3 further comprises determining the configured usage policy is executable based, at least in part on, the metadata model.

5. The method of claim 1, wherein de-allocating the one or more cloud service resources, further comprises one or more of:
suspending the one or more cloud service resources for a period of time;
reducing the one or more cloud service resources; and
replacing the one or more cloud service resources with one or more comparable cloud service resources where the usage cost exceeds a certain amount.

6. The method of claim 1, wherein managing the configured usage policy, further comprises monitoring deployment and usage of the one or more cloud service resources of one or more cloud services provisioned to fulfill the one or more cloud services, wherein monitoring deployment and usage includes rebalancing the one or more cloud service resources to align usage costs with actual usage according to the configured usage policy.

7. The method of claim 6 further comprises rebalancing the one or more cloud service resources of the one or more cloud services to conform the one or more cloud services to the one or more parameters of the configured usage policy, wherein rebalancing includes consolidating workload within the one or more cloud service resources, de-allocating one or more inactive cloud service resources, and renegotiation a usage cost associated with a cloud service.

8. A computer program product for reducing usage costs incurred by a cloud service consumer through improved allocation and management of cloud service resources, the computer program product comprising:
one or more computer readable storage devices and program instructions stored on the one or more computer readable storage devices, the program instructions comprising:
program instructions to determine, by one or more computer processors, a configured usage policy, wherein determining the configured usage policy includes receiving one or more responses to a set of configuration prompts, wherein the one or more responses include one or more usage parameters;
program instructions to validate, by one or more computer processors, the configured usage policy;
program instructions to determine, by one or more computer processors, one or more rules governing the configured usage policy, wherein the one or more rules governing the configured usage policy include at least a rule to optimize usage costs to the cloud service consumer based on an actual usage of one or more cloud service resources;
program instructions to execute, by one or more computer processors, the one or more rules governing the configured usage policy, wherein executing the one or more rules includes de-allocating the one or more cloud service resources to align usage costs with the actual usage of the one or more cloud service resources; and
program instructions to manage, by one or more computer processors the one or more cloud service resources according to the configured usage policy, wherein managing includes negotiating with a cloud service provider for a new rate commensurate to the actual usage of the one or more cloud service resources.

9. The computer program product of claim 8, wherein the one or more usage parameters to include:
one or more associated physical resources of one or more cloud services;
a duration for consuming the one or more cloud services;
one or more policy driven rules governing usage of the one or more cloud services;
a usage pattern;
a number of users; and
a number of virtual machines.

10. The computer program product of claim 8, wherein program instructions to validate the configured usage policy, further comprising program instructions to render the configured usage policy as a metadata model, wherein the metadata model describes the configured usage policy syntax and semantics.

11. The computer program product of claim 10 further comprising program instructions to determine the configured usage policy is executable based, at least in part on, the metadata model.

12. The computer program product of claim 8, wherein de-allocating the one or more cloud service resources further comprises one or more of:
suspending the one or more cloud service resources for a period of time;
reducing the one or more cloud service resources; and
replacing the one or more cloud service resources with one or more comparable cloud service resources where the usage cost exceeds a certain amount.

13. The computer program product of claim 8, wherein program instructions to manage the configured usage policy, further comprising program instructions to monitor deployment and usage of the one or more cloud service resources of one or more cloud services provisioned to fulfill the one or more cloud services, wherein monitoring deployment and usage includes rebalancing the one or more cloud service resources to align usage costs with actual usage according to the configured usage policy.

14. The computer program product of claim 13 further comprises program instructions to rebalance the one or more cloud service resources of the one or more cloud services to conform the one or more cloud services to the one or more parameters of the configured usage policy, wherein rebalancing includes consolidating workload within the one or more cloud service resources, de-allocating one or more inactive cloud service resources, and renegotiation a usage cost associated with a cloud service.

15. A computer system for defining a cloud usage policy, the computer system comprising:
one or more computer processors;
one or more computer readable storage media;

program instructions stored on at least one of the one or more computer readable storage media for execution by at least one of the one or more computer processors, the program instructions comprising:

program instructions to determine, by one or more computer processors, a configured usage policy, wherein determining the configured usage policy includes receiving one or more responses to a set of configuration prompts, wherein the one or more responses include one or more usage parameters;

program instructions to validate, by one or more computer processors, the configured usage policy;

program instructions to determine, by one or more computer processors, one or more rules governing the configured usage policy, wherein the one or more rules governing the configured usage policy include at least a rule to optimize usage costs to the cloud service consumer based on an actual usage of one or more cloud service resources;

program instructions to execute, by one or more computer processors, the one or more rules governing the configured usage policy, wherein executing the one or more rules includes de-allocating the one or more cloud service resources to align usage costs with the actual usage of the one or more cloud service resources; and program instructions to manage, by one or more computer processors the one or more cloud service resources according to the configured usage policy, wherein managing includes negotiating with a cloud service provider for a new rate commensurate to the actual usage of the one or more cloud service resources.

16. The computer system of claim 15, wherein de-allocating the one or more cloud service resources further comprises one or more of:
   suspending the one or more cloud service resources for a period of time;
   reducing the one or more cloud service resources; and
   replacing the one or more cloud service resources with one or more comparable cloud service resources where the usage cost exceeds a certain amount.

17. The computer system of claim 15, wherein program instructions to manage the configured usage policy, further comprising program instructions to monitor deployment and usage of the one or more cloud service resources of one or more cloud services provisioned to fulfill the one or more cloud services, wherein monitoring deployment and usage includes rebalancing the one or more cloud service resources to align usage costs with actual usage according to the configured usage policy.

18. The computer system of claim 17 further comprises program instructions to rebalance the one or more cloud service resources of the one or more cloud services to conform the one or more cloud services to the one or more parameters of the configured usage policy, wherein rebalancing includes consolidating workload within the one or more cloud service resources, de-allocating one or more inactive cloud service resources, and renegotiation a usage cost associated with a cloud service.

* * * * *